United States Patent [19]

Greene

[11] 4,412,636

[45] Nov. 1, 1983

[54] GARMENT HANGING APPARATUS FOR PASSENGER AUTOMOBILES

[76] Inventor: Thomas K. Greene, 190 Weeks Rd., Glen Falls, N.Y. 12801

[21] Appl. No.: 407,779

[22] Filed: Aug. 13, 1982

[51] Int. Cl.³ .......................... B60R 7/00; A47F 7/24
[52] U.S. Cl. ................................. 224/313; 248/224.3
[58] Field of Search ......... 224/313, 42.45 A, 42.46 A; 211/86; 248/224.3, 221.4

[56] References Cited

U.S. PATENT DOCUMENTS

| | | | |
|---|---|---|---|
| 2,777,624 | 1/1957 | Nelson | 224/313 |
| 2,969,881 | 1/1961 | Lilly | 224/313 X |
| 3,279,620 | 10/1966 | Nesbitt | 248/224.3 X |

Primary Examiner—Steven M. Pollard
Attorney, Agent, or Firm—Helsin & Watts

[57] ABSTRACT

Hanging clothing can be conveniently carried in fixed position in the passenger compartment of an automobile in readily accessible manner and without obstructing the driver's view by apparatus comprising a hanger beam anchored to the vehicle roof structure and of size and location inconspicuous and out of the way for the driver and passengers, and means including garment hangers and spring steel leaf springs carried by the hanger beam by which garments are securely carried in assembled relation and readily loaded and unloaded from the vehicle with their hangers.

10 Claims, 9 Drawing Figures

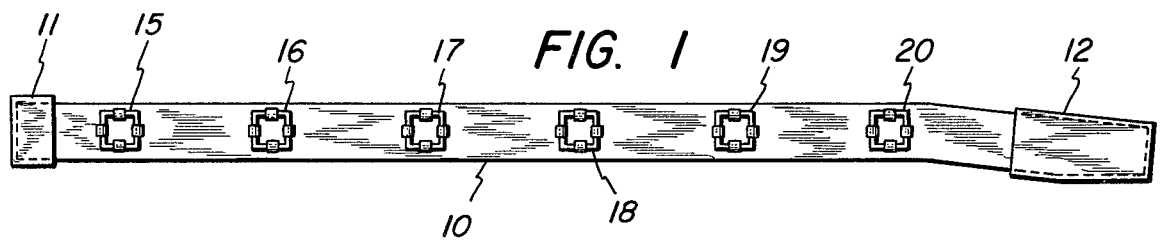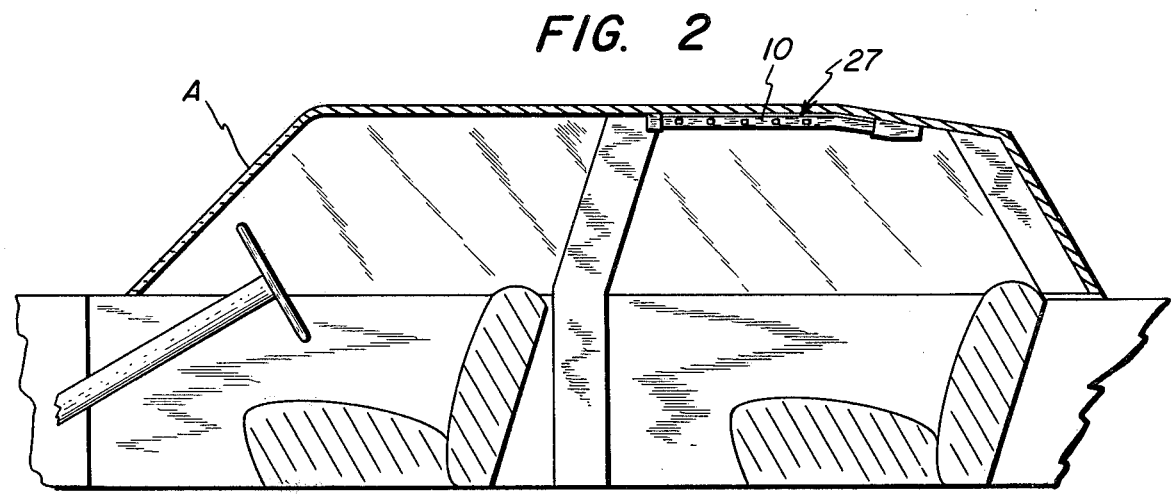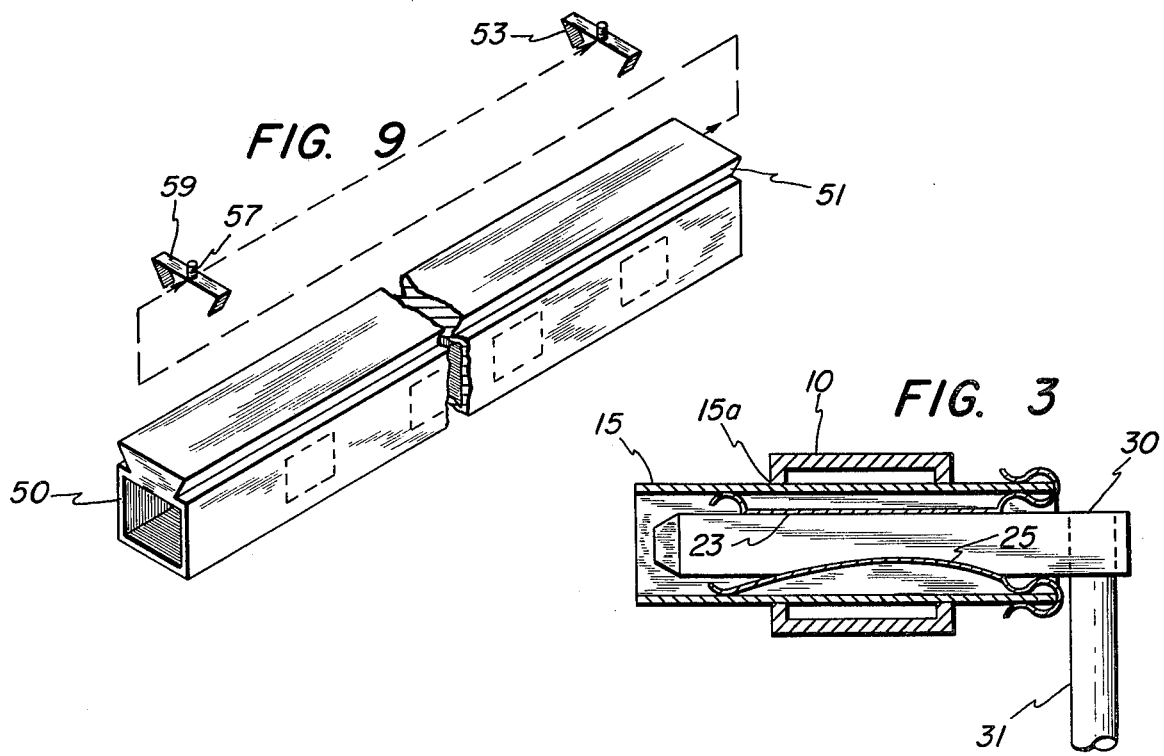

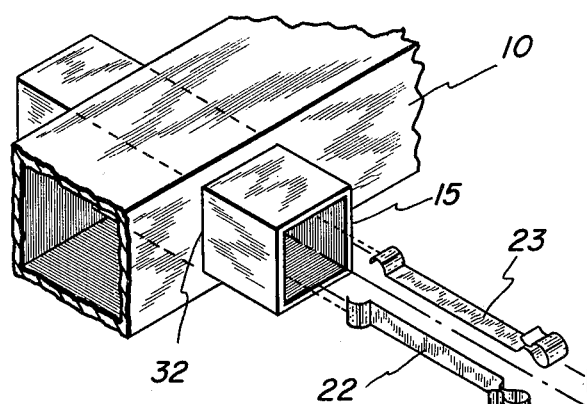
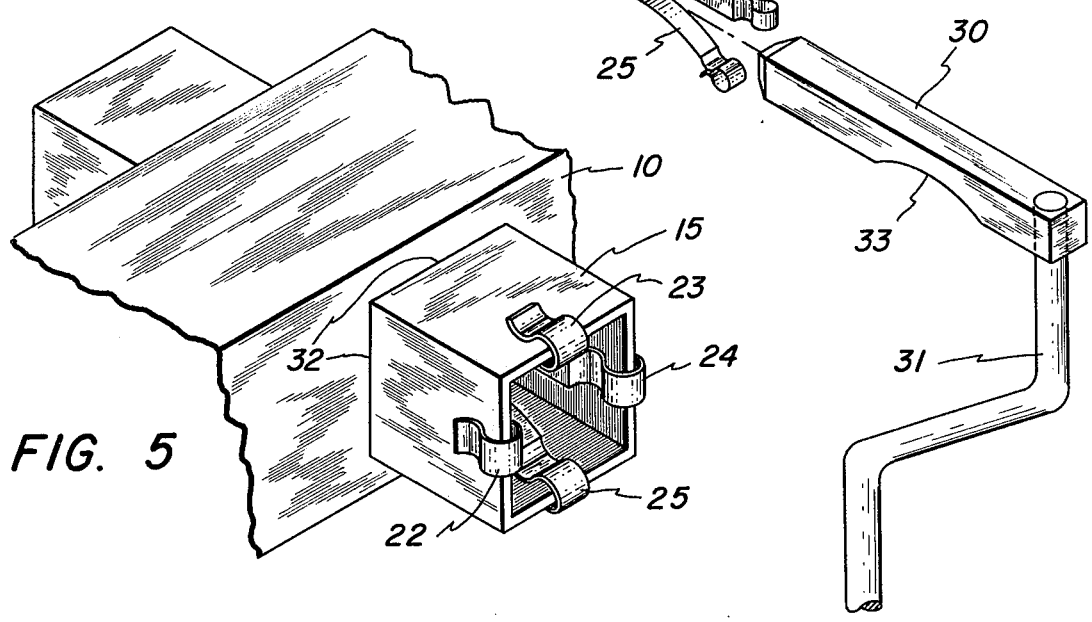
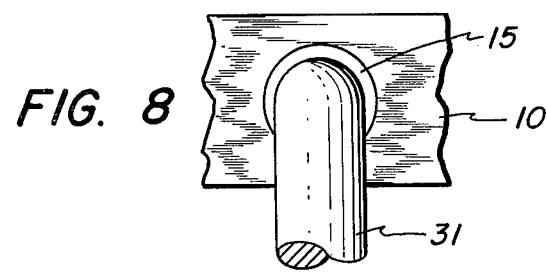
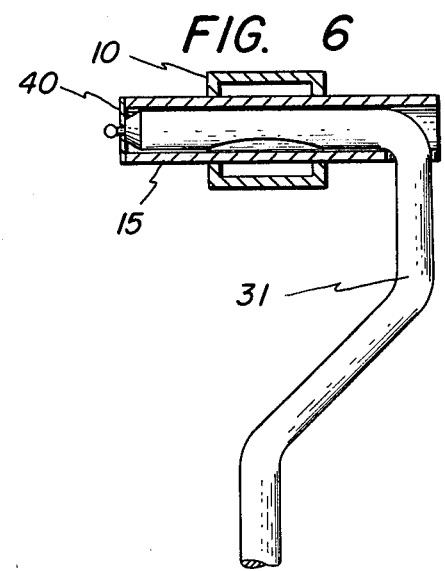
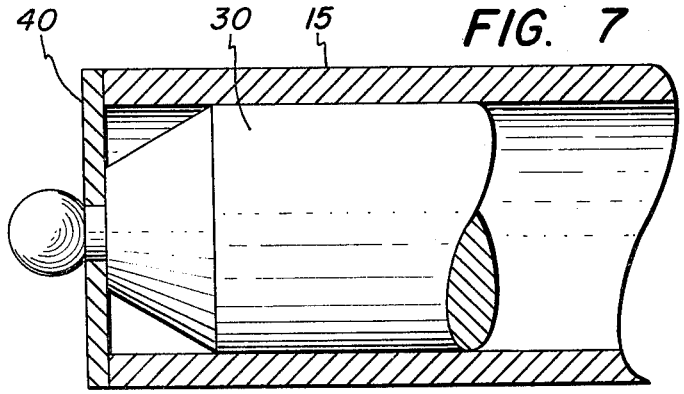

GARMENT HANGING APPARATUS FOR PASSENGER AUTOMOBILES

FIELD OF THE INVENTION

The present invention relates generally to garment hanging art and is more particularly concerned with novel apparatus for carrying hanging clothing in the passenger compartment of a closed automobile.

BACKGROUND OF THE INVENTION

For virtually as long as there have been closed passenger automobiles there has been a demand for means for carrying hanging clothing in them in a convenient and easily accessible, but at the same time, out-of-the-way manner in so far as possible. Consequently, a wide variety of hooks, rods and other fitments have been devised for the purpose and some of them have seen extensive use for long periods of time. Thus, the simple small hook provided as original equipment secured to a pillar or hung on a roof top hand grip has long been a standard feature of some four and five passenger car lines of major domestic and foreign automobile manufacturers. On the other hand, hanger rods have long been popular with those requiring somewhat more carrying capacity of this type than hooks can afford. These means and the others of the prior art all fail in one way or another, however, to provide a fully satisfactory response to the long standing demand. For instance, the greater capacity of the rod hanger over that of the hook is gained at the expense of rear view mirror visability.

SUMMARY OF THE INVENTION

By virtue of the present invention which is predicated on my novel concepts set out below, the shortcomings of the prior art particularly the compromises thereby necessitated, can be avoided and additional advantages can be gained. It is now possible for the first time to my knowledge to have both good rear view visability and garment load carrying capacity. In fact, it is possible at the same time to have side window visability which is effectively blocked by clothing hung on the prior art hooks or rod beams. Moreover, these advantages are not offset by any substantial disadvantage, my invention being easily installed in existing automobiles as well as those in production and being easily used as hanging garments are loaded and unloaded readily and carried spaced apart and in fixed and desired attitude within the automobile. Additional advantages of my invention include the fact that loaded or unloaded hangers are supported in their vehicle in position and restrained against relative motion while being resiliently retained in assembly and the further fact that the hangers can be used apart from their vehicle to support garments in stable manner and securely on conventional brackets, rods and hooks.

One of my new concepts underlying this invention is to provide stationary means which is securely fastened or anchored to the automobile roof structure and which while not in use is inconspicious in the passenger compartment and out of the way of vehicle occupants. Another related idea is to locate the stationary means so that in use it will carry hanging garments disposed at right angles to the usual arrangement in the prior art, that is, in array lengthwise of the automobile rather than transversely of it. As a corollary notion, a stationary means which preferably takes a form of an elongated hanger beam having transverse apertures is disposed with its axis generally parallel to that of the automobile. Further, the apparatus of this invention includes a hollow hanger receptacle post in each beam aperture and secured to the beam, garment hangers with terminal portions to hangers with terminal portions to be received in the hollow post and means releasably retaining the garment hangers in assembly with a hanger bar by spring effect or elastically deformable material as rubber which is bonded or suitably othewise secured to the hanger bar.

Briefly described, the apparatus of this invention comprises an elongated hanger beam shaped and adapted for secure attachment in fixed position to an automobile roof structure and having a plurality of transverse apertures. This apparatus further includes a hollow hanger post extending through each aperture of the beam and secured to the beam, and gargment hangers having end portions to be disposed in the hollow post. In addition, resilient means are disposed within the post to serve to retain hangers securely with a readily releasable assembly with the hanger beam. In more specific terms, the hanger beam in assembly with an automobile is disposed generally lengthwise of the vehicle and fastened by suitable mechanical means to the automobile roof structure. The transverse apertures in the hanger bar thus are open to the sides of the vehicle to facilitate insertion of the garment hanger ends into and removal of the garment hangers from the receptacle post carried by the hanger beam. The elastically deformable means are designed to engage the hanger ends and to prevent lateral motion of the hangers while resiliently restraining relative motion of the hangers axially of the hollow posts. As a further feature of the apparatus of this invention, the upper or hook portion of each hanger may have an elongated shank so that a garment carried on a hanger supported on the hanger beam does not obstruct the driver's view through the automobile rear window.

BRIEF DESCRIPTION OF THE DRAWINGS

Those skilled in the art will gain a further and better understanding of this invention and its advantages over the prior art from consideration of the drawings accompanying or forming a part of this specification taken in conjunction with a detailed description set out below in which:

FIG. 1 is a view in side elevation of a hanger beam assembly of this invention with garment hangers removed;

FIG. 2 is a fragmentary, side-elevational view of a closed passenger automobile equipped with the assembly shown in FIG. 1;

FIG. 3 is a transverse sectional view of the FIG. 1 assembly including garment hanger in mounted position and showing the relationship between the hanger, its receiving post and resilient retaining means, and the hanger beam;

FIG. 4 is an exploded perspective view of the apparatus of FIG. 3, the hanger beam being shown only fragmentarily;

FIG. 5 is an enlarged, fragmentary, perspective view of the apparatus of FIG. 3 with the hanger removed to show to the best advantage the manner of attachment of the spring steel springs to the hollow hanger receptacle post;

FIG. 6 is a view like that of FIG. 3 showing an alternative kind of resilient hanger retaining means of this invention;

FIG. 7 is an enlarged fragmentary view of the apparatus of FIG. 6 showing, in detail, the relationship between the hanger and its resilient retention means in the form of a rubber ring bonded to one end of the hollow post receiving the hanger end portion;

FIG. 8 is a fragmentary elevational view of the assembly of FIG. 6 showing the cross-sectional sizes and shapes of the post and the hanger end portion; and, FIG. 9 is a fragmentary perspective view of an alternative garment hanger beam of this invention and clamps anchored to an automobile roof structure for supporting engagement with the hanger beam.

DETAILED DESCRIPTION OF THE INVENTION

As shown in FIG. 1, hanger beam 10 is an elongated hollow aluminum or steel beam contoured to fit against the roof of a passenger vehicle. The two ends of beam 10 are closed by caps 11 and 12 suitably of plastic material and the beam metal is itself either painted or covered with plastic material which is intended to match the interior decor and coloring of the roof section of the vehicle with which the beam is to be installed. Six transverse apertures through the beam are spaced uniformly apart along the length of the beam to receive garment hanger receptacle posts 15, 16, 17, 18, 19 and 20 which in turn are suitably secured in position to the beam against relative motion or removal of the posts from the beam during the course of use of the structure for its intended purpose. In this FIG. 1 form of the invention, resilient means in the form of four separate spring steel spring elements 22, 23, 24 and 25, which are shown in detail in FIG. 4, are carried within each of the six posts, being secured to the posts in a manner to be described below and being positioned in opposed pairs to provide positive gripping action to retain the hangers in position as will also be described in reference to other drawings.

A typical installation of the FIG. 1 apparatus is shown in FIG. 2 in which automobile A is shown with contoured roof section 27 which beam 10 conforms to and is secured to by means of self-locking metal screws (not shown). In this installation, the beam 10 is positioned parallel to rear doors or side partitions in the vehicle for easy access from either side and, for convenience, may, it will be understood, be disposed to one side or the other of the middle of the car as when another such beam is to be provided for increased garment carrying capacity.

Now with reference to FIGS. 3, 4 and 5, it will be apparent that the spring steel spring elements are fitted to the post as they are crimped at one end and clamped against the one end of the post 15 and within the post in each instance, the terminal portion of each spring is bent on a short radius for the purpose mainly of facilitating assembly of the spring elements with the post but also, as illustrated in FIG. 3, is for the purpose of assuring contact of the spring elements through most of their lengths with the end portion 30 of a hanger 31 disposed in the post. The post 15, as shown in FIG. 3, is attached to the hanger beam 10 by tack welds 32, but it will be understood that in some instances, it may be desirable to otherwise make this attachment as by brazing, soldering, sweating, press fitting, or the like. It will also be understood that each post need not be any longer than necessary to provide secure support for its garment hanger, but that preferably the posts extend on opposite sides of the hanger beam to facilitate assembly and attachment of the posts to the beam and to insure firm and stable support of garment hangers carried by the hanger beam and post assembly.

As shown to the best advantage in FIG. 4, the hanger end 30 is received in post 15 carried by hanger beam and is of rectangular cross-section except that it has formed on its underside a relatively long, shallow recess 33. This is for the main purpose of facilitating use of the hanger apart from this assembly, and particularly the hanger beam, as when the hanger with its garment is removed from the vehicle equipped with this apparatus for use in hanging garments in a closet or other convenient place equipped with the usual rods, hooks or other supports for garment hangers. It will also be noted in this connection that the spring means includes lower spring 25 of the series of four illustrated in FIG. 4 which has been formed to match the curvature of the recess 33 on the underside of the end of the hanger so that the parts fit securely together as shown in FIG. 3. The hanger is thus resiliently restrained against removal from the assembled hanger beam 10 and its post 15 and, at the same time, by means of the two side-engaging spring elements 22 and 24, the hanger end portion is rigidly restrained against relative rotational motion which could result in hangers of the assembly moving toward each other as they are carried, loaded or unloaded, in the vehicle and subjected to quick starts and stops in the course of normal travel.

The embodiment of this invention illustrated in FIGS. 6 and 7 represents an alternative to the preferred embodiment illustrated in the drawings described above. In this instance, the resilient retaining means 40 takes the form of a flat ring or disc of material such as rubber or suitable plastic which is elastically deformable under ordinary temperature conditions so that it will receive and hold end 41 of hanger 42 in place in assembly with the hanger receptacle post 45 for as long as it is desired to maintain those parts in assembled relation. Ring 40 is adhesively attached to one end of post 46 so that bulb-shaped end 41 of the hanger can be pushed through the ring for resilient retention of the hanger in assembled relation with the post 45.

Unlike the apparatus of FIGS. 1–5, that of FIGS. 6 and 7 does not include leaf springs and the hanger receptacle posts and hanger-end portions are of circular rather than rectangular cross section. Additionally, the hanger-end portions are of diameter matching the inside diameter of the posts so that these posts fit well together as indicated by the drawings.

In the embodiment of this invention shown in FIG. 9, garment hanger beam 50 corresponds in general to beam 10 in size, structure and function, differing mainly in the manner of its attachment to an automobile roof structure. Thus, instead of being fastened in place by anchor bolts or screws, beam 50 is provided with a pair of longitudinally-extending grooves 51 to receive opposed tines or teeth 53 of four clamps 55 (two shown) spaced lengthwise of the automobile and secured to the roof structure by anchoring screws 57. Beam 50 is mounted in place in the automobile for use in supporting garments as described above by sliding the beams axially into engagement with clamps 55 so that tines 53 fit in grooves 51 and firmly engage beam 50 and securely hold it along with its load of garment hangers and garments. An advantage of this arrangement is that the clamps can be installed independently during vehicle manufacture. Another advantage is that the hanger beam can be removed and can be used in another vehicle similarly equipped with such clamps.

What is claimed is:

1. Garment hanging apparatus for passenger automobiles comprising an elongated hanger beam shaped and adapted for secure attachment in fixed position to an automobile roof structure and having a plurality of transverse apertures, a hollow hanger receptacle post disposed in each aperture and secured to the hanger beam, a plurality of garment hangers having terminal portions to be received in the hanger receptacle post in the hanger beam, and resilient means disposed within the hanger receptacle post for resiliently and releasably engaging garment hanger portions inserted into the said post in assembling the hanger with the hanger beam.

2. The apparatus of claim 1 in which the resilient means is a plurality of spring steel leaf springs secured to each of the hanger receptacle posts.

3. The apparatus of claim 1 in which the resilient means is a plurality of elastically deformable members secured to the hanger receptacle post.

4. The apparatus of claim 3 in which the resilient means consists of plastic material or rubber which maintains its elasticity under room temperature conditions.

5. The apparatus of claim 1 including means for attaching the hanger bar to an automobile roof structure comprising self-locking metal screws.

6. In a passenger automobile having a fixed roof structure, the combination of an elongated garment hanger beam secured in fixed position to the roof structure with its axis disposed generally lengthwise of the automobile and having a plurality of transverse apertures, a hollow hanger receptacle post disposed in each transverse aperture and secured in fixed position to the hanger beam, a plurality of garment hangers having terminal portions received in the transverse hanger receptacle posts, and resilient retaining means disposed within each said post resiliently and releasably engaging and retaining hanger portions in the said posts while the hanger beam supports the hangers.

7. A combination of claim 6 in which the hanger beam is disposed with its axis substantially parallel to the axis of the automobile and directly behind the driver's seat.

8. The combination of claim 6 in which the garment hangers have hook portions with free ends for receipt in the hanger receptacle posts and additionally have elongated shank portions so that garments carried by the garment hanger do not obstruct rearward view of the driver of the vehicle.

9. The combination of claim 6 in which the said hanger receptacle post each have substantially rectangular interior cross-section, and in which the garment hangers have hook portions with free ends of matching rectangular cross-section for receipt in the hanger receptacle post in relative position-maining engagement with the said resilient means.

10. The combination of claim 9 in which the resilient means comprises four spring steel leaf springs secured to each hollow post in opposed pairs for engagement individually with the four sides of each hanger end portion within each post whereby each hanger is firmly restrained against motion toward other hangers supported by the hanger beam.

* * * * *